US010083166B2

(12) United States Patent
Liu et al.

(10) Patent No.: US 10,083,166 B2
(45) Date of Patent: Sep. 25, 2018

(54) APPARATUS AND METHOD FOR GENERATING INSPECTION REPORT(S)

(71) Applicant: CANON KABUSHIKI KAISHA, Tokyo (JP)

(72) Inventors: Xin Liu, Beijing (CN); Yinan Li, Beijing (CN)

(73) Assignee: Canon Kabushiki Kaisha, Tokyo (JP)

(*) Notice: Subject to any disclaimer, the term of this patent is extended or adjusted under 35 U.S.C. 154(b) by 376 days.

(21) Appl. No.: 13/933,525

(22) Filed: Jul. 2, 2013

(65) Prior Publication Data
US 2014/0013219 A1    Jan. 9, 2014

(30) Foreign Application Priority Data
Jul. 6, 2012    (CN) .......................... 2012 1 0233984

(51) Int. Cl.
*G06F 17/00* (2006.01)
*G06F 17/27* (2006.01)
*G06F 17/28* (2006.01)

(52) U.S. Cl.
CPC .......... *G06F 17/27* (2013.01); *G06F 17/2881* (2013.01)

(58) Field of Classification Search
CPC . G06F 19/321; G06F 19/3487; G06F 17/2881
See application file for complete search history.

(56) References Cited

U.S. PATENT DOCUMENTS 7,793,217 B1 * 9/2010 Kim et al. .................... 715/255
8,195,594 B1 * 6/2012 Bryce ............................. 706/47
2005/0114283 A1 * 5/2005 Pearson et al. ................ 706/50
(Continued)

FOREIGN PATENT DOCUMENTS

| CN | 1680963 A | 10/2005 | |
|---|---|---|---|
| JP | P2009-87038 A | 4/2009 | |
| WO | WO 2009041236 A1 * | 4/2009 | ............ G06Q 50/00 |

OTHER PUBLICATIONS

Katsuya Sotomura. ">News Navi Chapter 06<, Latest version of 'ATOK' marking the 30th anniversary." MacPeople Jul. 2012, Issue 292, [ASC II Media Works (Japan)] 18.10 May 29, 2012: 19. Print.

*Primary Examiner* — Scott Baderman
*Assistant Examiner* — Barbara Level
(74) *Attorney, Agent, or Firm* — Canon U.S.A., Inc. IP Division

(57) ABSTRACT

In one embodiment, an apparatus for generating an inspection report is provided which is configured to perform certain tasks. Input from a user for an inspection report and displaying contents of the inspection report which currently has been inputted, is received. One or more context features from one of the displayed contents is identified, in a real time manner. inspection data for the object based on one or more of the identified context features is processed. A list of items of the processed inspection data is caused to be displayed, upon detection of a specific user input, to be selected by the user. And, when an item in the list is selected by the user, processed inspection data corresponding to the selected item, is inserted into the inspection report. In some embodiments, the one of the displayed contents includes keywords relating to at least one of a body region, a part of the object, anatomical structure of the object, and a pathological structure of the object.

22 Claims, 11 Drawing Sheets

(56) References Cited

U.S. PATENT DOCUMENTS

| | | | |
|---|---|---|---|
| 2006/0116577 A1* | 6/2006 | DeWitt | A61B 8/00 600/437 |
| 2008/0031503 A1* | 2/2008 | Kanada et al. | 382/128 |
| 2008/0228522 A1* | 9/2008 | Davis et al. | 705/2 |
| 2009/0106047 A1* | 4/2009 | Bay et al. | 705/2 |
| 2009/0187407 A1* | 7/2009 | Soble et al. | 704/260 |
| 2009/0228299 A1* | 9/2009 | Kangarloo et al. | 705/2 |
| 2010/0008553 A1* | 1/2010 | Holmstrom | 382/128 |
| 2010/0189366 A1* | 7/2010 | Iizuka et al. | 382/209 |
| 2011/0066635 A1* | 3/2011 | Moriya | 707/769 |
| 2011/0126127 A1* | 5/2011 | Mariotti et al. | 715/753 |
| 2012/0035963 A1* | 2/2012 | Qian et al. | 705/3 |
| 2012/0054230 A1* | 3/2012 | Kanada | 707/769 |
| 2012/0130223 A1* | 5/2012 | Reicher | G06F 19/321 600/407 |
| 2014/0149407 A1* | 5/2014 | Qian et al. | 707/737 |

* cited by examiner

Patient Name Moore Lin    Sex Male    Age 37    Department
In-Patient No. 224475    Ward No. 3947    Bed No. 6Out-Patie
X-Ray No. 44852    CT No.    MRI No.    DSA No.

Name of Examination:    Plain chest radiography

Technique:    Postero-anterior and left lateral projection

Findings:
On the frontal view the transparency of the upper and middle fields of the ribs |

Diagnosis:

Fig. 5

Patient Name Moore Lin    Sex Male    Age 37    Department
In-Patient No. 224475    Ward No. 3947    Bed No. 6Out-Patie
X-Ray No. 44852    CT No.    MRI No.    DSA No.

Name of Examination:    Plain chest radiography

Technique:    Postero-anterior and left lateral projection

Findings:
On the frontal view the transparency of the upper and middle fields of the ribs |

Diagnosis:

1    2 to 4
2    58 mm
3    1972 mm$^2$
4    35%
5    25°

— 601

Patient Name Moore Lin    Sex Male    Age 37        Department
In-Patient No. 224475    Ward No. 3947        Bed No. 6Out-Patie
X-Ray No. 44852    CT No.        MRI No.        DSA No.

Name of Examination:    Plain chest radiography

Technique:    Postero-anterior and left lateral projection

Findings:

On the frontal view the transparency of the upper and middle fields of the ribs 2 to 4 |

Diagnosis:

Fig. 7

Patient Name Moore Lin    Sex Male    Age 37    Department
In-Patient No. 224475    Ward No. 3947    Bed No. 6Out-Patie
X-Ray No. 44852    CT No.    MRI No.    DSA No.

Name of Examination:    Plain chest radiography

Technique:    Postero-anterior and left lateral projection

Findings:
On the frontal view the transparency of the upper and middle fields of the ribs 2 to 4 is decreased. A round |

Diagnosis:

| 1 |  | 50 mm diameter |
| 2 |  | 58 mm length |
| 3 |  | between rib 2 to 4 |
| 4 |  | CTR is 35% |
| 5 |  | Angle is 25° |

Patient Name Moore Lin    Sex Male    Age 37         Department
In-Patient No. 224475    Ward No. 3947      Bed No. 6Out-Patie
X-Ray No. 44852    CT No.         MRI No.         DSA No.

Name of Examination:    Plain chest radiography

Technique:    Postero-anterior and left lateral projection

Findings:
On the frontal view the transparency of the upper and middle fields of the ribs 2 to 4 2 to 4 is decreased. A 50 mm diameter round opaque mass lesion

Diagnosis:

Fig. 9

APPARATUS AND METHOD FOR GENERATING INSPECTION REPORT(S)

CROSS-REFERENCE

This application claims priority under 35 U.S.C. 119 to Chinese Patent Application No. 201210233984.9, filed on Jul. 6, 2012, which is hereby incorporated by reference in its entirety.

BACKGROUND

Field

The present disclosure relates to apparatus and method for generating inspection report(s).

Description of the Related Art

When making an inspection report for an object which is subjected to an inspection, it may need to be described in the diagnosis report the findings, measurement results, or diagnoses, for example, resulted from the inspection in detail. As an instance, when a user (such as, operator, doctor/physician, or the like) inputs via a computer system an inspection report (such as, diagnosis report) for an object (such as, an product, a patient, or the like) which is subjected to an inspection, for example, radiological inspection such as gamma-ray inspection, X-ray inspection, Computer Tomography (CT), and magnetic resonance imaging (MRI), type-B ultrasonic Brightness mode, digital subtraction angiography (DSA), electrocardiography (ECG), and the like, he or she may need to describe in detail the findings or measurement results and even his/her diagnosis result in text in the inspection report.

Generally, from the inspection one or more desired images, or even video data, can be obtained. The user (for example, operator, physician) may make various marks, indications, or the like on the image which can be displayed on a screen, or perform various manual or automatic measuring on the features of the image(s). For example, the measurement results include geometrical attributes (e.g. length, angle, area, and volume dimensions) as well as attributes specific to medical knowledge (e.g. the Cardio Chest Ratio (CTR)). When the user describes the image findings in detail, the measurement results including values for each of the findings are required to be described. Traditionally, the measurement results are inputted manually by the physician.

There are some methods and apparatuses having been proposed for automatically generating inspection report(s). In U.S. Patent Application No. 2009/0106047 (Patent reference 1), a method for producing medical inspection report(s) is provided for avoiding manual input of inspection reports, wherein diagnosis data is captured for a selected display context, and then automatically converted into a report context.

However, due to the diversity and complexity of descriptions of physiopathology and diseases, such methods and apparatuses still cannot be widely used and many hospitals and clinicians still would favour manually inputting reports in textual form. The disclosure in the patent reference 1 cannot resolve the following problems occurring from manually inputting inspection report(s):

the user (for example, an operator, a doctor/physician, or the like) may need to write or input the textual description via a user interface (for example, on a display screen of a computer system) while finding, locating, and/or measuring specific findings on another user interface (for example, on another display screen) for displaying inspection images, and referencing the another display screen when writing the text report, which is not convenient and disadvantageous;

the user may possibly need to calculate the values and conceive appropriate phrases for description purpose; and manually inputting may introduce mistakes.

For at least partly addressing the above problems, the present embodiments are proposed.

SUMMARY

According to an embodiment of the present disclosure, an apparatus for generating inspection report(s) is provided which comprises: a report input unit for receiving input from a user for an inspection report relating to an object which has been subjected to one or more inspections and displaying contents of the inspection report which currently has been inputted; a context feature identifying unit for identifying, in a real-time manner, one or more context features from the displayed contents of the inspection report which currently has been inputted; a processing unit for processing inspection data for the object based on one or more of the identified context features, the inspection data resultant from the one or more inspections subjected to by the object; and an input assistant unit configured to cause the report input unit to display a list of items of the inspection data processed by the processing unit, upon detection of a specific user input, to be selected by the user, and to insert, when an item in the list is selected by the user, processed inspection data corresponding to the selected item into the inspection report.

According to another embodiment of the present disclosure, an apparatus for generating inspection report(s) is provided which comprises: an input unit operatively coupled to a processor, for receiving input from a user for an inspection report relating to an object which has subjected one or more inspections; a display unit coupled to the processor, for displaying contents of the inspection report which currently has been inputted; and the processor, comprising: a context feature identifying unit for identifying, in a real-time manner, one or more context features from the displayed contents of the inspection report which currently has been inputted; a processing unit configured to process inspection data for the object based on one or more of the identified context features, the inspection data resultant from the one or more inspections subjected to by the object; and an input assistant unit configured to cause the display unit to display a list of items of the inspection data processed by the processing unit, upon detection of a specific user input, to be selected by the user, and to insert, when an item in the list is selected by the user, processed inspection data corresponding to the selected item into the inspection report.

According to a further embodiment of the present disclosure, a method for generating inspection report(s) is provided which comprises: receiving input from a user for an inspection report relating to an object which has subjected one or more inspections and displaying contents of the inspection report which currently has been inputted; identifying, in a real-time manner, one or more context features from the displayed contents of the inspection report which currently has been inputted; processing inspection data for the object based on one or more of the identified context features, the inspection data resultant from the one or more inspections subjected to by the object; displaying a list of items of the processed inspection data, upon detection of a specific user input to be selected by the user; and inserting, when an item in the list is selected by the user, processed inspection data corresponding to the selected item into the inspection report.

According to an embodiment of the present disclosure, it would be not necessary for a user to write an inspection report via a user interface while referencing to another user interface for displaying an image or the measurements. Further, according to an embodiment of the present disclosure, a user would not need to input the measurement results (for example, various values) or calculate the values manually, thus potential mistakes in manually inputting can be avoided. In addition, the embodiment(s) can assist the user in conceiving of appropriate phrases for descriptive purposes. In brief, according to the embodiments of the present disclosure, the user's input experience can be improved.

It need be noted that the embodiments of the present disclosure are directed to apparatuses and methods for generating inspection report(s), so as to improve user's input experiences, but are in no sense directed to making a diagnosis or assisting user's diagnosis. Also it needs to be noted that although the present disclosure may be applicable to generate a medical report, the present disclosure can be applied in various industrial applications.

Further characteristic features and advantages of the present disclosure will be apparent from the following description with reference to the drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 5 illustrates an example screen on which the user input for an inspection report is displayed, according to an example embodiment of the present disclosure.

FIG. 7 illustrates a situation after the user selected the first item in the list.

FIG. 8 illustrates another example situation where a list of items of inspection data is displayed upon a specific user input is detected.

FIG. 9 illustrates a situation after the user selected the first item in the list.

DETAILED DESCRIPTION

Figure 1:
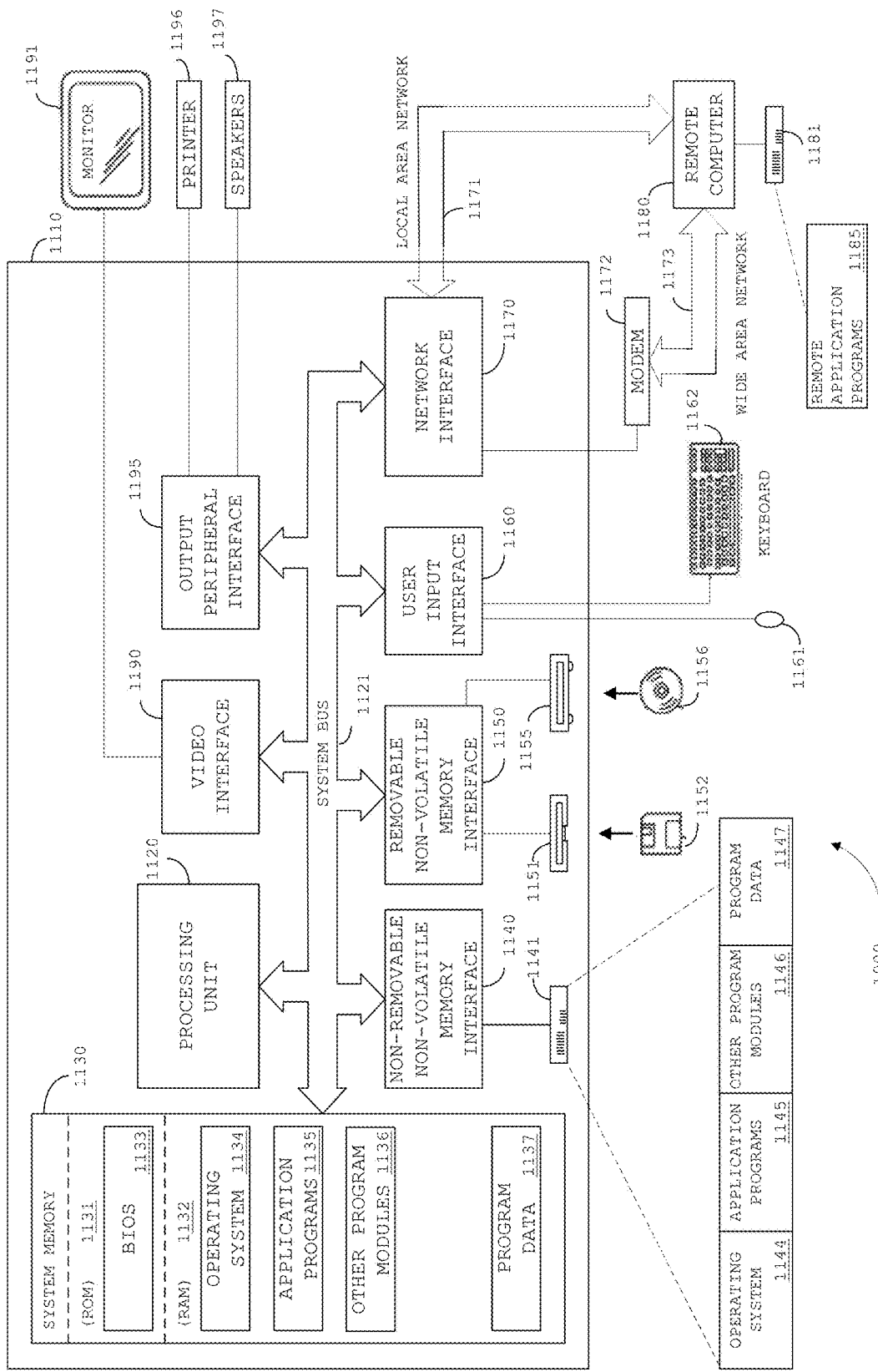
FIG. 1 is a block diagram showing a hardware configuration of a computer system which can implement some embodiments of the present disclosure.

Embodiments of the present disclosure will be described in detail below with reference to the drawings.

Please note that similar reference numerals and letters refer to similar items in the figures, and thus once an item is defined in one figure, it need not be discussed for following figures.

The term "inspection" as used herein may include medical inspection such as radiological inspection such as X-ray inspection, Computer Tomography (CT), and magnetic resonance imaging (MRI), type-B ultrasonic Brightness mode, digital subtraction angiography (DSA), electrocardiography (ECG), and the like, and industrial inspection such as gamma-ray inspection, radiography X-ray inspection, or the like. Moreover, although the inspection generally can provide one or more images (inspection images), it is not necessary to do so.

The term "inspection data" as used herein may comprise various information related to the inspection(s), including but not being limited to, findings and/or measurement results from inspection(s), for example, from one or more images derived from the inspection(s). The inspection data may further comprise information on the object, information on the inspections themselves, or the like, which will be described below in detail in connection with FIG. 5.

The term "user input" as used herein generally refers to the user input which has been inputted into the inspection report, that is, is displayed, if there is no or the context thereof does imply otherwise specific definition. By way of example, the user input may comprise, but not be limited to, a word, a phrase, or the like.

FIG. 1 is a block diagram showing a hardware configuration of a computer system 1000 which can implement the embodiments of the present disclosure.

As shown in FIG. 1, the computer system comprises a computer 1110. The computer 1110 comprises a processing unit 1120, a system memory 1130, non-removable non-volatile memory interface 1140, removable non-volatile memory interface 1150, user input interface 1160, network interface 1170, video interface 1190 and output peripheral interface 1195, which are connected via a system bus 1121.

The system memory 1130 comprises ROM (read-only memory) 1131 and RAM (random access memory) 1132. A BIOS (basic input output system) 1133 resides in the ROM 1131. An operating system 1134, application programs 1135, other program modules 1136 and some program data 1137 reside in the RAM 1132.

A non-removable non-volatile memory 1141, such as a hard disk, is connected to the non-removable non-volatile memory interface 1140. The non-removable non-volatile memory 1141 can store an operating system 1144, application programs 1145, other program modules 1146 and some program data 1147, for example.

Removable non-volatile memories, such as a floppy drive 1151 and a CD-ROM drive 1155, are connected to the removable non-volatile memory interface 1150. For example, a floppy disk 1152 can be inserted into the floppy drive 1151, and a CD (compact disk) 1156 can be inserted into the CD-ROM drive 1155.

Input devices, such a microphone 1161 and a keyboard 1162, are connected to the user input interface 1160.

The computer 1110 can be connected to a remote computer 1180 by the network interface 1170. For example, the network interface 1170 can be connected to the remote computer 1180 via a local area network 1171. Alternatively, the network interface 1170 can be connected to a modem (modulator-demodulator) 1172, and the modem 1172 is connected to the remote computer 1180 via a wide area network 1173.

The remote computer 1180 may comprise a memory 1181, such as a hard disk, which stores remote application programs 1185.

The video interface 1190 is connected to a monitor 1191.

The output peripheral interface 1195 is connected to a printer 1196 and speakers 1197.

The computer system shown in FIG. 1 is merely illustrative and is in no way intended to limit the scope, applications, or uses of the present disclosure.

The computer system shown in FIG. 1 may be implemented to any of the embodiments, either as a stand-alone computer, or as a processing system in an apparatus, possibly with one or more unnecessary components removed or with one or more additional components added.

Figure 2:
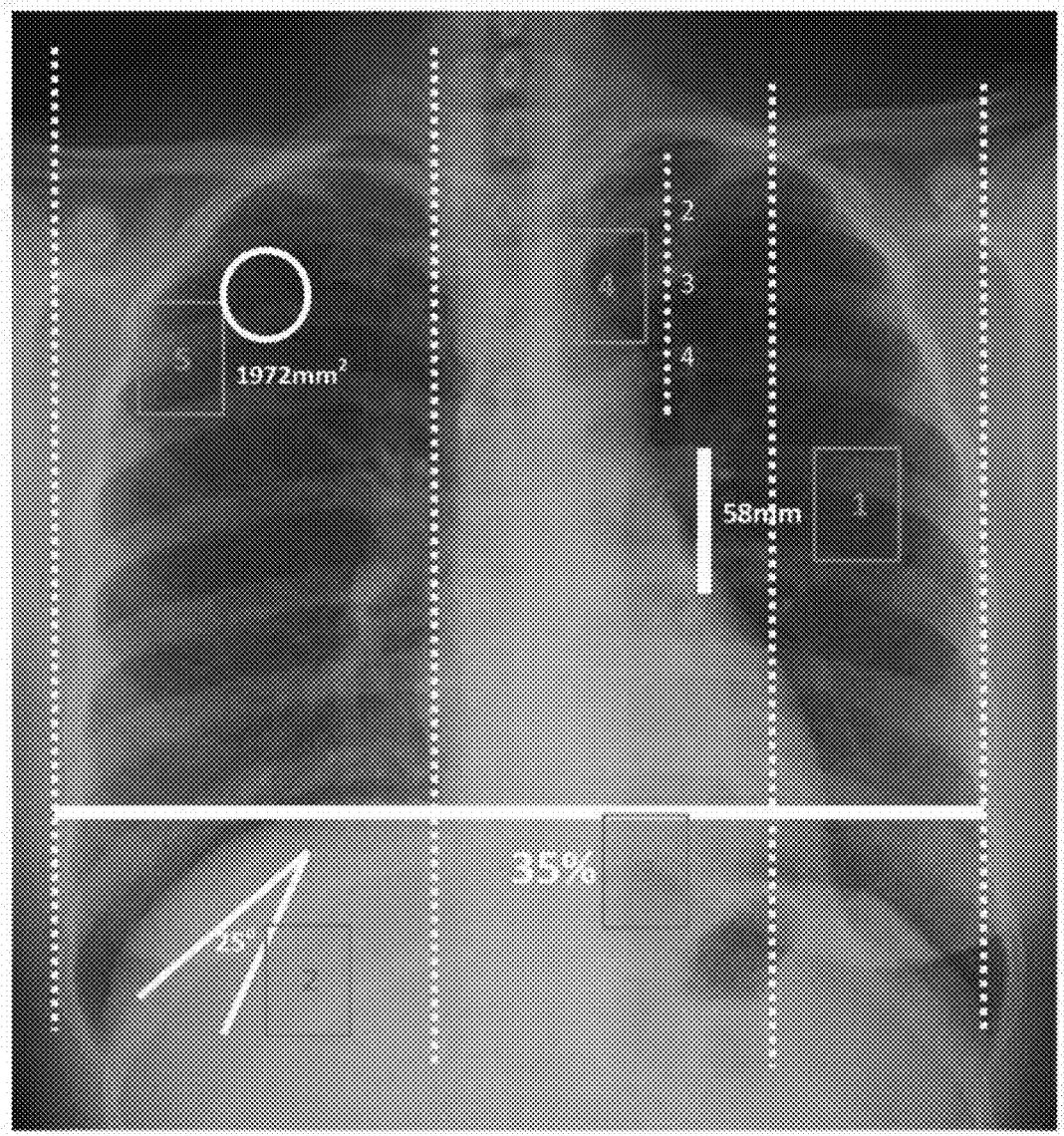
FIG. 2 illustrates an image resulted from an X-ray inspection in which several measurements have been performed.

FIG. 2 illustrates an image resulted from an X-ray inspection in which several measurements have been performed and numbered with numbers 1 through 5. By way of example, the image in FIG. 2 is shown as a radiography image. As shown, the user performed five (5) measurements on the image, as indicated with the numbers in blocks, which measurements are directed to those findings in his/her interest. The measurement results from the image can be collected as follows.

TABLE 1

| No. | Measurement Name/ Description | Value | Location | Regions/parts |
|---|---|---|---|---|
| 1 | Length | 58 mm | 646,454-647,603 | Left/Chest (lung, rib, heart) |
| 2 | Angle | 25° | 225,947 (117,142) | Right/Abdomen (peritoneum) |
| 3 | CTR | 35% | — | Chest (heart) |
| 4 | Rib label | 2 to 4 | 612,159-612,488 | Left/Chest (rib, lung) |
| 5 | Ellipse/circle | 1972 mm$^2$ | 237,242-265,270 | Right/Chest (rib, lung) |

As shown in Table 1, there currently are five measurements conducted: length, angle, CTR, rib label, ellipse/circle. The attributes with the measurements are also collected, such as measurement results (for example, values, or the like), locations in the image, regions/parts to which the measurements is directed, as shown in the Table 1.

The above table is merely an example of possible representation of the collected measurement results, which would be represented in various forms as known by those skilled in the art.

Figure 3:
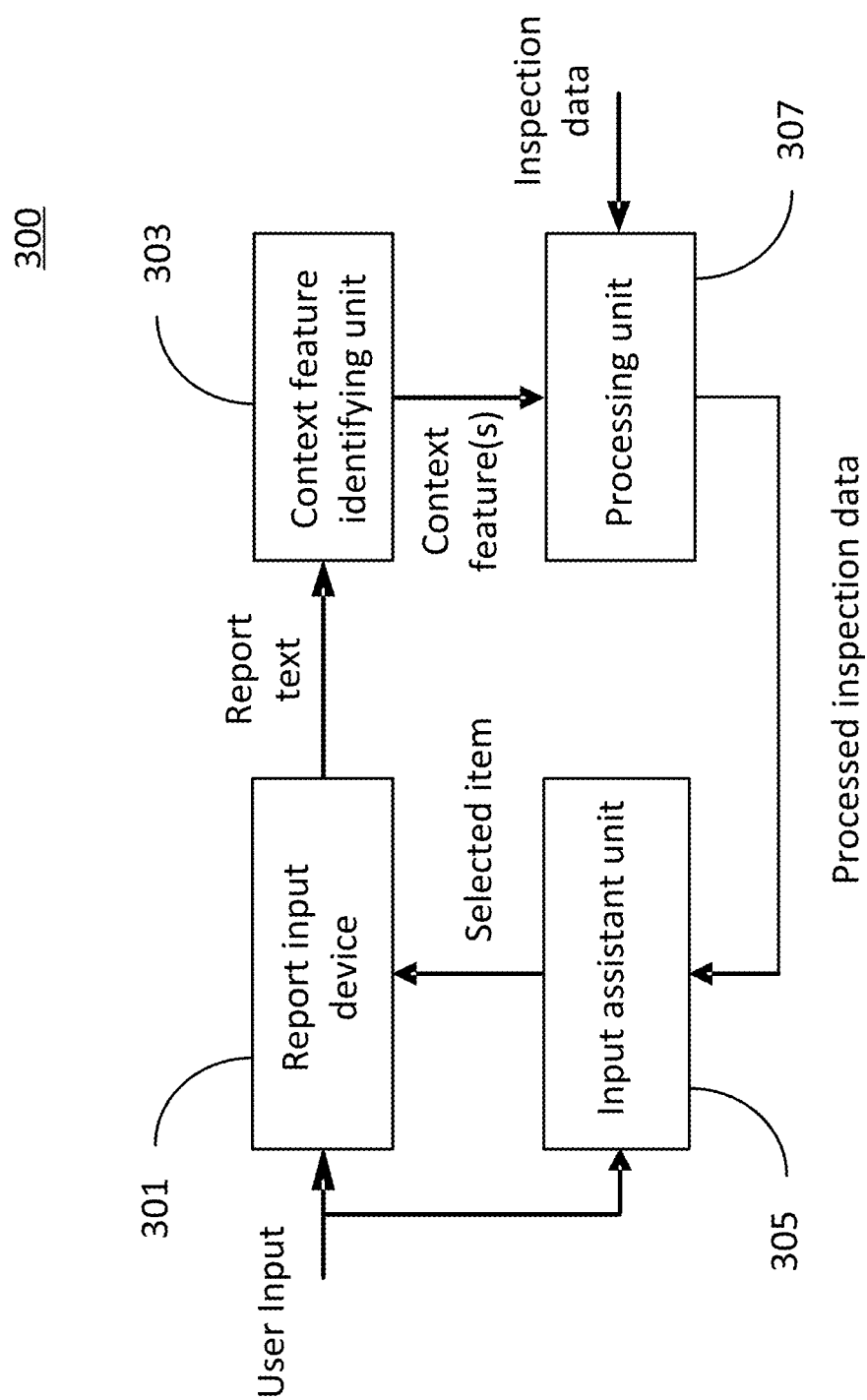
FIG. 3 illustrates an example block diagram of an apparatus for generating inspection report(s) according to an embodiment of the disclosure.

FIG. 3 illustrates an example block diagram of an apparatus 300 for generating inspection report(s) according to an embodiment of the disclosure.

The apparatus 300 includes a report input unit 301 for receiving input from a user for an inspection report relating to an object which has been subjected to one or more inspections and displaying contents of the inspection report which currently has been inputted. In an implementation, the report input unit 301 may be implemented with: an input unit for receiving the user input, such as keyboard, directing device, keypad, etc.; and a display unit for displaying the contents of the inspection report which currently has been inputted. However, the report input unit is not limited to the above implementation; for example, it may comprise a touch screen for both inputting and displaying.

FIG. 5 illustrates an example screen on which the user input for an inspection report is displayed, according to an example embodiment of the present disclosure. As shown, the inspection report may include, but is not limited to: information on the object (herein, a patient, for example), such as, name, gender, age, hyper susceptibility, identification numbers (for example, personal IDs, in-patient number, ward and bed numbers, etc.), and the like; information on the inspection itself to which the object is subjected, such as type of the inspection (for example, X-ray, CT, MRI, DSA, or the like), name of the inspection, technical features related, and the like; and findings from the inspection, such as information on specific regions, parts, anatomical structure, pathological structure, pathological changes, and/or the like. In addition, the inspection report may contain a section of user's diagnostic description.

As for the above contents or information to be included in the inspection report, at least a portion of them needs to be inputted by the user. Also, generally, textual descriptions are needed in an inspection report. For example, the details of the findings need to include textural/literal descriptions for each of the interested features in inspection image(s). Meanwhile, the measurement results (for example, the values) may be required to be presented in the inspection report. As shown in FIG. 5, the user has inputted "On the frontal view the transparency of the upper and middle fields of the ribs" so far, with an indicator "|" following to indicate the location where the future input will be continued and displayed.

Referring back to FIG. 3, the apparatus 300 may also include a context feature identifying unit 303 for identifying, in a real-time manner, one or more context features from the displayed contents of the inspection report which currently has been inputted. The context feature identifying unit 303 identifies context feature(s) according to predetermined rules. In an example of an embodiment, the context feature(s) can be identified by comparing user input with a predetermined set of words or phrases (which can collectively termed as keywords for convenience). The predetermined set of words or phrases can be included in a databank, for example. In such a case, if a user input matches with a predetermined keyword, it can be identified as a context feature. However, the rules for identifying the context feature(s) are not limited to the above example; for example, the context features can be identified based on parts of speech or semantic features. For example, a syntactic attribute to define a noun which may be identified as a context feature may possibly also be identified as a context feature. In an example of an embodiment of the present disclosure, the context features identified can be stored in various forms, for example, in a table (hereinafter, referred as context feature table).

By way of example, the context features may comprise: keywords relating to regions or parts of the object, for example, such as rib, lung, chest, kidney, etc. for a patient as the object; and/or words or phrases which are selected based on parts of speech or semantic features, for example, such as "round" (which is an attribute), length, angle, or the like.

Further, the apparatus 300 includes an input assistant unit 305. The input assistant unit 305 is configured to cause the report input unit 301 to display a list of items of the inspection data processed by a processing unit (which will be described later), upon detection of a specific user input, to be selected by the user, and to insert, when an item in the list is selected by the user, processed inspection data corresponding to the selected item into the inspection report.

The operations of the input assistant unit 305 will be further described in detail with reference to FIGS. 6 and 7.

Figure 6:
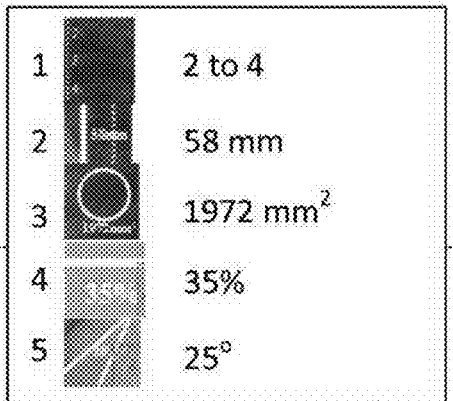
FIG. 6 illustrates an example situation where a list of items of inspection data is displayed upon a specific user input is detected.

FIG. 6 illustrates an example situation where a list of items of inspection data is displayed upon a specific user input is detected, in which an inset 601 on the screen of FIG. 5 is shown. FIG. 7 illustrates the situation after the user selected the first item in the list.

As shown in FIG. 6, the user input the word "ribs", which is displayed, at the first time in the report. In such a case, if the inputted word "rib" or "ribs" is identified as a context feature by the context feature identifying unit 303, it can be determined that a specific user input is detected. Thus, the input assistant unit 305 may control the report input unit 301 to display a list of items of the inspection data. The items of the inspection data to be displayed would preferably have been processed by a processing unit which will be described in detail later. For example, as shown in FIG. 6, a window 601 can be popped up to display the processed inspection data. The list can be displayed in various forms other than the above popup window. In the inset (popup window) 601 illustrated in FIG. 6, five items of the inspection data resulted from the image illustrated in FIG. 2 are listed.

Then, the user can select an item in the list, for example, with use of a keyboard, a directing device (for example, a mouse or the like), or the like. When an item in the list is selected by the user, for example, the first item rib labels "2 to 4" is selected, processed inspection data corresponding to the selected item, "2 to 4", is inserted into the inspection report, as illustrated in FIG. 7.

Assume that after the insertion of the rib labels the user continue to input for the report, and again the word "rib" or "ribs" is inputted, in such a case, since the word "rib" has been identified and thus stored in the context feature table for the inspection report, the newly inputted word "rib" or "ribs" is matched with the identified context feature "rib", therefore, it can also be determined that a specific user input is detected. In such a case, it is not necessary to compare the inputted word with the databank, which would be advantageous in enhancing performance.

That is, the detection of a specific user input can be determined in the case that the specific user input is identified as a context feature or be matched with an identified context feature.

In addition, as shown in FIG. 8, the input assistant unit 305 further causes the report input unit 301 to display a thumbnail for each listed item of the processed inspection data.

Again turning back to FIG. 3, the apparatus 300 also includes a processing unit 307 for processing inspection data for the object based on one or more of the identified context features, the inspection data resultant from the one or more inspections subjected by the object. As shown in the inset 601 of FIG. 6, the items of the inspection data for the object resulted from the inspection to which the object is subjected are sorted based on a single identified context feature "ribs". In this sample of implementation, the rib label is the most related with the feature "ribs". In some other implementations, the list of items can be sorted based on two or more identified context features, for example, the most-recently identified features. In some further implementations, each of the identified context features may have a weight, which may be determined based on, for example, the distance thereof from the current input positions indicated by a flickering indicator "|". In such a case, it is preferable that the closer to the current input position an identified context feature is, the bigger the weight thereof is; meanwhile, an identified context far away from the current input position may possibly be omitted.

In another example of this embodiment, the processing unit 307 may filter the items of the inspection data based on one or more identified context features, for example, several of the most-related items can be listed, while others are filtered, that is, not shown in the list.

In a further example of this embodiment, the processing unit 307 can perform calculating and/or converting operations on various types of values included in the inspection data. For example, the processing unit 307 can calculate the area of a region, converting the values (for example, from diameter into radius), or the like.

According to some embodiments of the present disclosure, the apparatus 200 may further comprise an inspection device for providing inspection data (not shown). In an embodiment, the inspection device for providing inspection data may be a Picture Archiving Communication System (PACS), or a terminal thereof. While, in another embodiment, the device for providing inspection data may be a memory device storing the inspection data in a predetermined format, for example, in a DATACOM format which is commonly used in the related art.

According to some embodiments of the present disclosure, the present disclosure can be applied to a Hospital Information System, particularly, to Radiology Information System (RIS)/Picture Archiving Communication System (PACS).

Hereinafter, another embodiment of the present disclosure will be described with reference to FIGS. 4, 8, and 9.

Figure 4:
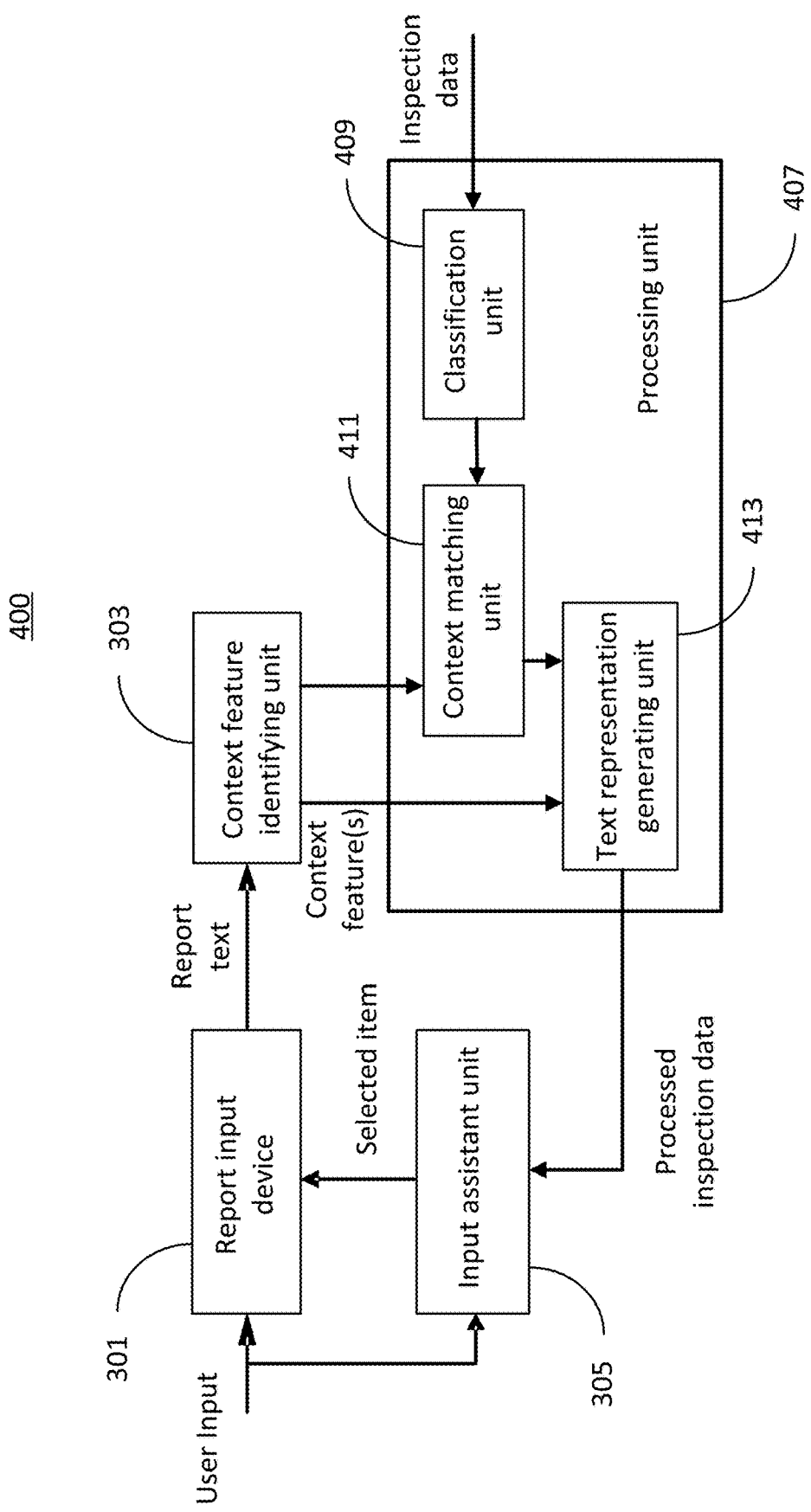
FIG. 4 illustrates an example block diagram of an apparatus for generating inspection report(s) according to another embodiment of the disclosure.

FIG. 4 illustrates a block diagram of an apparatus 400 for generating inspection report(s) according to another embodiment of the disclosure. The apparatus 400 includes a report unit 301, a context feature identifying unit 303, an input assistant unit 305, and a processing unit 407. The apparatus 400 in FIG. 4 is the same as the apparatus 300 in FIG. 3 except the processing unit 407; thus, those components which are the same as those of apparatus 300 are indicated by the same reference and the description thereof are omitted.

Processing unit 407 according to this embodiment may comprise: a classification unit 409 for classifying the items of the inspection data; and a context matching unit 411 for matching each item of the inspection data to one or more of the identified context features with reference to the classification result from the classification unit, and for sorting and/or filtering the items of the inspection data based on the matching result.

The operation of the processing unit 407 will be described in detail with reference to FIGS. 8 and 9. FIG. 8 illustrates a situation where a list of items of inspection data is displayed when a specific user input, "round", is detected. FIG. 9 illustrates the situation after the first item in the list is selected by the user.

As shown in FIG. 4, the classification unit 409 may classify the items of the items of the inspection data based on any of the following:

attributes of the object, (herein, a patient, for example), such as, name, gender, age, identification numbers (for example, personal IDs, in-patient number, ward and bed numbers, etc.) and the like;

attributes of the inspection(s), such as type of the inspection (for example, X-ray, CT, MRI, PET (Positron Emission Tomography), or the like), name and/or purpose of the inspection, imaging angles, other technical features related, and the like; and attributes of findings and/or measurement results from the inspection(s), such as information on specific regions, parts, anatomical structure, pathological structure, pathological changes, tissue metabolic activity, and/or the like.

In an embodiment of the present disclosure, when classifying an item of the inspection data, the classification unit 409 may apply one or more tags to the item of the inspection data, so as to identify one or more categories into which the item is classified.

For example, for the item No. 5 as illustrated in FIG. 2, that is, the circle to indicate a round opaque mass lesion, it can be classified or tagged with geometry tag such as circle, an anatomic part tag such as rib or chest, or the like. The items of the inspection data are similarly classified. The criteria for the classifying can be arbitrarily selected as required.

By way of example, as illustrated in FIG. 8, the word "round" is inputted, and the word "round" is assumed to be identified as a context feature by the context feature identifying unit 303. The context matching unit 411 matches each item of the inspection data (for example, 5 items as illustrated in FIG. 2 and table 1) to one or more of the identified context features with reference to the classification result from the classification unit 409, for example, with reference to the tags. In some embodiments the one or more of the identified context features may be the most-recently identified ones, while, in other embodiments, they may be selected according to different criteria, for example, they may be the most frequently identified or inputted. The present disclosure shall not be limited to any particular embodiments.

For example, the context matching unit 411 may score the items of the inspection data when matching the items (that is, evaluate a matching score for each item), with reference to the classification results.

The context matching unit 411 then may perform sorting/filtering on the items of the inspection data based on the matching result. For example, the items to be displayed may be sorted or arranged based on the scores thereof, and the item with the highest score will be displayed in the list as the first candidate, the item with the second highest score will be displayed as the second candidate, and so on.

Specifically, in the example of FIG. 8, as mentioned above, the item No. 5 corresponding to "1972 mm$^2$" as illustrated in FIG. 2 and Table 1 can be classified and thus tagged with geometry tag such as circle, an anatomic part tag such as rib or chest, or the like. Generally, a word "round" may likely be related to a tag "circle" in semantics. Also, the word "round" may relate to a tag "length", for example, diameter or radius. According to these predetermined rules based on semantic features (for example, the meanings), the "1972 mm$^2$" item (No. 5 in Table 1) is evaluated with highest score when matching with the identified context feature "round" and thus displayed as the first candidate, since among all the fives items listed in the Table 1 this item is tagged with "circle" and thus is the most related one to the context feature "round". On the other hand, the item No. 1 corresponding to "58 mm" in FIG. 2 and Table 1 is evaluated with the second highest score when matching with the context feature "round" and is displayed as the second candidate, since it is tagged with "length" and thus is the second most related one to the context feature "round". The other items in FIG. 2 and Table 1 are evaluated with even lower scores when matching with the context feature "round", and thus are displayed as the third to fifth candidates. In the case where the items of the inspection data are too much to be displayed in the whole popup window, the items can be displayed in multiple pages.

In some embodiments of the present disclosure, the processing unit 407 may optionally comprise a text representation generating unit 413, as illustrated in FIG. 4. The text representation generating unit 413 may generate one or more textual representations, as the processed inspection data, for an item of the inspection data based on one or more of the identified context features (for example, the most recently identified one(s)).

As illustrated in FIG. 8, textual representations for the items listed are also displayed in the inset 801 (representative of, for example, a window). For instance, a diameter of 50 mm can be automatically calculated from the area of 1972 mm$^2$ of the circle (item No. 5 as illustrated in FIG. 2 and Table 1). In such a case, a textual representation "50 mm diameter" can be generated accordingly for this item. When the first candidate in the list is selected, the textural representation "50 mm diameter" is to be inserted into the inspection report. According to an implementation of this embodiment, the textual representation is generated conforming to predetermined syntactical rules. In an example of this embodiment, the textural representation generating unit 413 may check or collect the parts of speech of a few words or phrases just ahead of the word "round", and then generate the textual representation based on the syntactical relations among the user input "round" and those words or phrases ahead of the word "round". For example, as illustrated in FIG. 9, a textural representation for the first candidate of the list "50 mm diameter" is inserted before the word "round" in the inspection report, so as to conform to predetermined syntactical rules. As another example, assuming that the user does not select any item in the list as illustrated in FIG. 8 though the "round" is identified as a context feature, the user may continue to input "opaque mass lesion" after the word "round". Assuming that the word "lesion" is or has been identified as a context feature, the processing unit 407 may sort the items of the inspection data based on the two identified context feature "round" and "lesion". In such a case, the textual representation generating unit 413 may generate a textural representation "with a diameter of 50 mm" based on, for example, the parts of speech of each word of the expression "round opaque mass lesion".

Incidentally, the text processing unit can be readily combined with the embodiment shown in FIG. 3.

According to some embodiments of the present disclosure, the detecting of the specific user input can be configured by user. In an embodiment, it is contemplated that the detecting of the specific user input can be triggered if, for example, some predetermined or user-set keys or buttons are pressed and/or released; however, the triggering manner is not limited thereto, for example, the detecting can be triggered by predetermined actions of user.

For example, the user may enable or disable the above-mentioned detecting and/or identifying by pressing and releasing a key for example, "F12". Or, the user may trigger the detecting by pressing and releasing the key "SPACE". In another example, the user may enforce a word currently inputted to be identified as a context feature by, for example, pressing and releasing a key such as "F2". The configurations would be in various manners and can be freely set by the user or designer.

Further, in the embodiments of the present disclosure, in the case where the current user input is identified as a context feature, it can be determined that the specific user input is detected.

Figure 10:
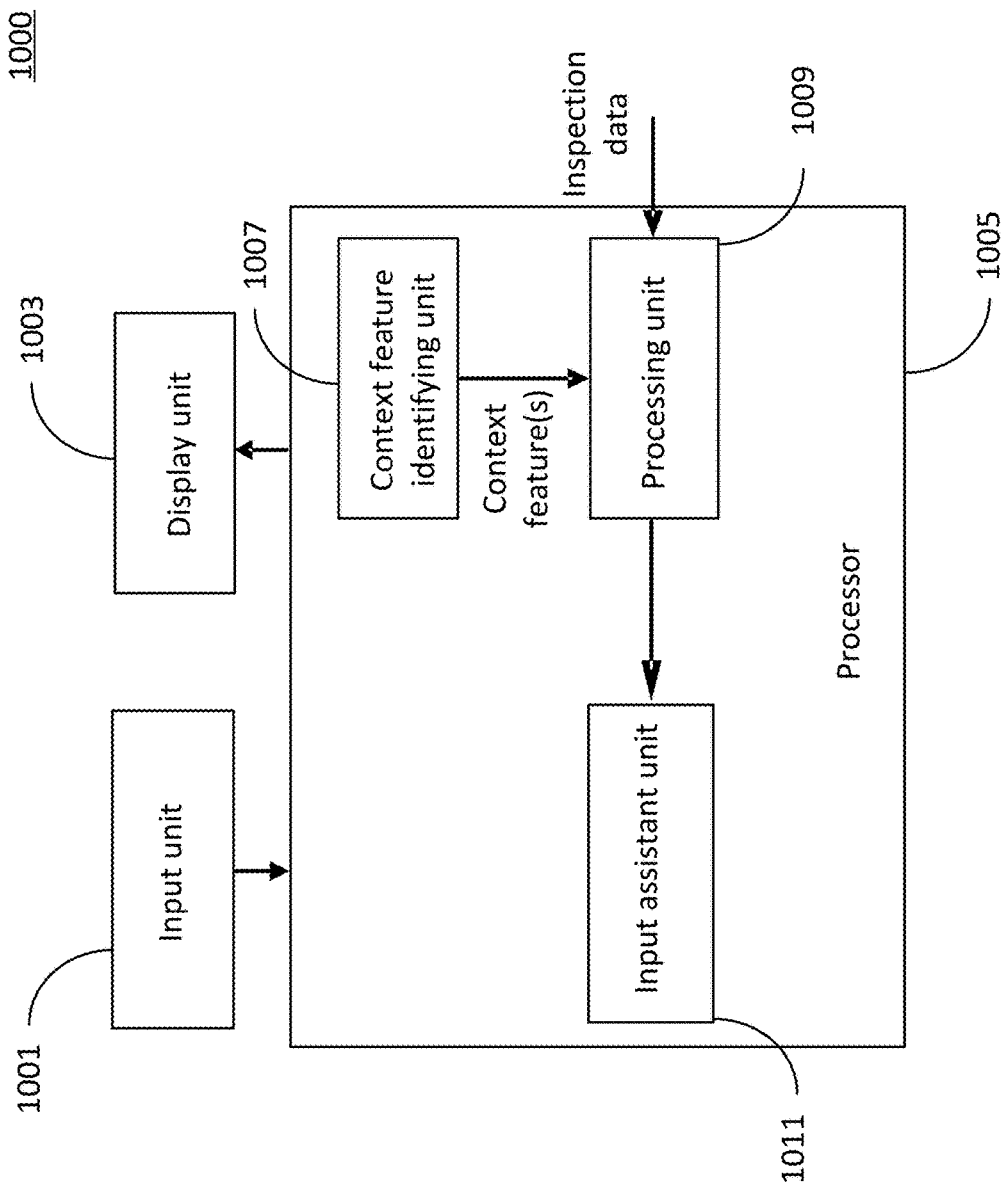
FIG. 10 illustrates an apparatus for generating inspection report(s) according to a still further embodiment of the present disclosure.

FIG. 10 illustrates an apparatus 1000 for generating inspection report(s) according to a still further embodiment of the present disclosure. The apparatus 10000 comprises: a processor 1005; an input unit 1001 operatively coupled to a processor, for receiving input from user for an inspection report relating to an object which has subjected one or more inspections; and a display unit 1003 coupled to the processor, for displaying contents of the inspection report which currently has been inputted. The processor 1005 may comprise: a context feature identifying unit 1007 for identifying, in a real-time manner, one or more context features from the displayed contents of the inspection report which currently has been inputted; a processing unit 1009 for processing inspection data for the object based on one or more of the identified context features, the inspection data resultant from the one or more inspections subjected by the object; and an input assistant unit 1011 configured to cause the report input unit to display a list of items of the inspection data processed by the processing unit, upon detection of a specific user input, to be selected by the user, and to insert, when an item in the list is selected by the user, processed inspection data corresponding to the selected item into the inspection report.

Figure 11:
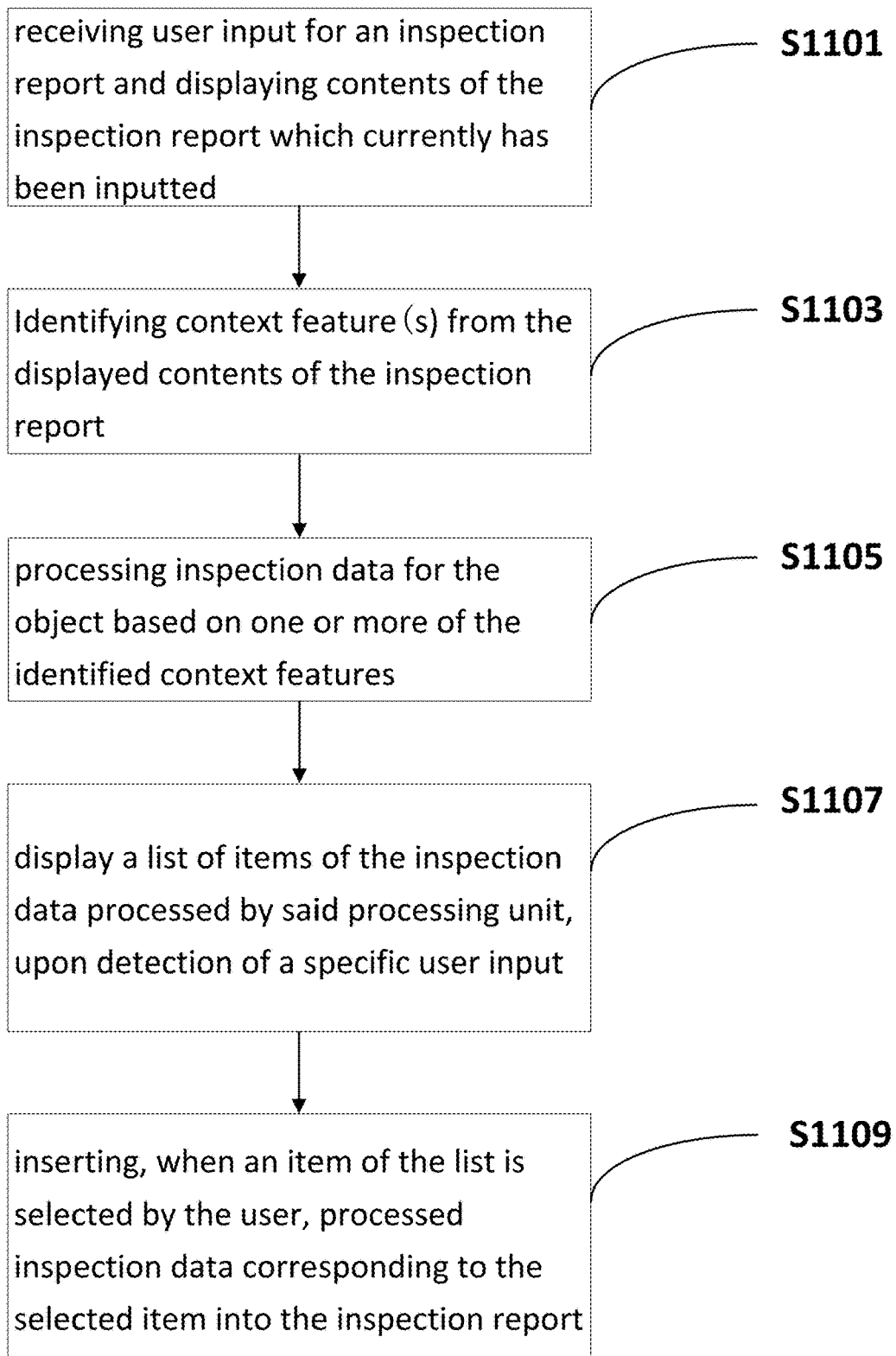
FIG. 11 illustrates a flow chart of a method for generating inspection report(s) according to an embodiment of the present disclosure.

FIG. 11 illustrates a flow chart of a method for generating inspection report(s) according to an embodiment of the present disclosure.

At step S1101, input from a user is received for an inspection report relating to an object which has been subjected to one or more inspections, and the contents of the inspection report which currently has been inputted is displayed.

At step S1103, one or more context features are identified, in a real-time manner, from the displayed contents of the inspection report which currently has been inputted.

At step S1105, inspection data for the object is processed based on one or more of the identified context features, the inspection data resultant from the one or more inspections subjected by the object.

At step S1107, a list of items of the inspection data processed is displayed upon detection of a specific user input to be selected by the user.

At step S1109, processed inspection data corresponding to the selected item into the inspection report is inserted when an item in the list is selected by the user.

In an example of this embodiment, the method further comprises providing the inspection data from an inspection device.

In an example of this embodiment, the processing S1105 of the inspection data may comprise: sorting and/or filtering the items of the inspection data, and/or, calculating and/or converting various types of values included in the inspection data.

In an example of this embodiment, the processing S1105 of the inspection data may comprise: classifying the items of the inspection data; matching each item of the inspection data to one or more of the identified context features based on the classification result from the classification; and sorting and/or filtering the items of the inspection data based on the matching result In an example of this embodiment, the processing S1105 of the inspection data may comprise: generating one or more textual representations, as the processed inspection data, for an item of the inspection data based on one or more of the identified context features.

In the embodiment(s) of the present disclosure, the one or more of the identified context features comprises the most-recently-identified context feature(s); however, the present disclosure is not limited thereto.

According to other embodiments of the present disclosure, the apparatus for generating inspection report(s) may further comprise a highlight unit (not illustrated) which can selectively highlight the findings and/or measurement results on the images according to the list of the item, as illustrated in FIG. 2. With the findings and/or measurement results being highlighted on the images, the use is enabled to focus on the outstanding inspection data among a number of inspection results.

In a specific implementation, only a predetermined number of the findings or measurement results corresponding to the items as illustrated in FIG. 6 or 8, of which items priorities on high in the list, are highlighted. For example, the findings and/or measurement results corresponding to the top three items in the list can be highlighted on the image as illustrated in FIG. 2. In another instance, the items in the list are ranked in line with scores as above described, in such a case, the findings and/or measurement results corresponding to the listed items with top three scores can be highlighted. The priority as used herein can include but not be limited to, any order numbers, ranks, scores, or the like of the related items.

In another implementation, the findings and/or measurement results can be highlighted differently depending on the priorities thereof. For example, the measurement with the highest priority in the list can be highlighted in red colour, the measurement with less high (for example, the second and the third) priorities can be displayed in yellow colour, and others can be displayed in grey colour. With the highlighting, a user can recognize the item priorities from the inspection data. The mode for highlighting can be varied, for example, according to user settings.

Also, it is contemplated that such highlighting can be automatically adjusted upon the list is popped out. For example, all inspection data shown in FIG. 2 is displayed in a normal mode (that is, not highlighted), and then the high priority items can be highlighted at the timing that the items are displayed in the list. As such, this enables a user to confirm the high priority item together with confirming a relationship with other items.

In another implementation, all inspection data is shown in the normal mode in FIG. 2, and then the high priority item(s) can be highlighted while other items are not displayed or displayed indistinctly when the items are displayed in the list. This enables user(s) to focus on the outstanding inspection data among a lot of inspection results.

The term "highlight" and its variants refer to display an object differently from others so that the object can attract attention than the others, and thus, various manners can be employed for highlighting an object, for example but not limited to in different colours, shapes, patterns, etc.

Also, it is contemplated that in the case that the user input of the report has been suspended up to a predetermined time, for example, a few seconds, the inspection data which has not been incorporated previously into the inspection report can be displayed on the image(s) with/without being highlighted.

In another implementation, in the case that the user input for the report has been suspended up to a predetermined time, for example, a few seconds, a list can be displayed in which the inspection data which has not been incorporated previously into the inspection report can be listed with/without being highlighted. Such implementations may enable the user to check input omissions in the inspection report.

It is also contemplated that various information relating to the listed items can be selectively displayed in addition to or alternative to the inspection information for the items as shown in FIG. 6 or 8. For example, comparable standard values relating to the item(s), for example, some highly prioritized items (e.g., top three or five items in the list) can be additionally displayed so as to indicate the reference values for the user's convenience and use. In another example, the previous inspection data relating to an item can also be shown in the list so as to indicate the change between the previous inspection and the current inspection. In the case that an item is selected by the user, the various information can also be inserted into the report.

Although the above embodiments of FIGS. 6-8 are described with short phases, values, and the like being displayed in the listed and then being inserted into the report, candidate sentences can also be displayed which may possibly be suitable to be input in the inspection report in accordance with a selection of one of listed items. For example, a set of candidate sentences relating to a selected item in the list can be displayed upon the selection of the item so that the user can select a sentence from the candidates without repeating input the sentence manually.

In some other embodiments, the apparatus of the disclosure can further include a video interface which can be operatively coupled to the report input unit and capable of being operatively coupled to one or more displays. In some of the embodiments, the video interface can be included in the display unit. One of the displays can be adaptable for displaying the contents of the inspection report which currently has been inputted. Another one of the displays can be adaptable for displaying the one or more images as well as the findings and/or measurement results therefrom. There can also be a third display for displaying other related information, the image(s) in the inspection history, case information, etc.

The steps of the method according to the present disclosure can be merged into one single step, or a step of the method can be divided into several separate steps. Also, the steps are not necessarily performed successively as above, that is, some steps can be performed simultaneously, or even the performing orders thereof can be reversed.

As would be appreciated from the above described embodiments, the object may comprise a patient, the inspection report may comprise a medical report for the patient, and the inspection may comprise any inspection on the patient from which an image can be derived. Further, the keywords relating to regions of the object may comprise keywords relating to body regions of a patient, and the keywords relating to parts of the object may comprise keywords relating to anatomical structure or pathological structure of a patient.

Further, the embodiments of the present disclosure can be freely combined with each other without departing from the spirit and scope of the disclosure.

It is possible to embody the method and apparatus of the present disclosure in many ways. For example, it is possible to embody the method and apparatus of the present disclosure through software, hardware, firmware or any combination thereof. The above described order of the steps for the method is only intended to be illustrative, and the steps of the method of the present disclosure are not limited to the above specifically described order unless otherwise specifically stated. In some embodiments, the present disclosure may also be embodied as programs recorded in recording medium, including machine-readable instructions for implementing the method according to the present disclosure. Thus, the present disclosure also covers the recording medium which stores the program for implementing the method according to the present disclosure.

Although some specific embodiments of the present disclosure have been demonstrated in detail with examples, it should be understood by a person skilled in the art that the above examples are only intended to be illustrative but not to limit the scope of the present disclosure. It should be understood by a person skilled in the art that the above embodiments can be modified without departing from the scope and spirit of the present disclosure.

What is claimed is:

1. An apparatus for generating an inspection report, comprising:
   at least one processor; and
   a memory storing a program including instructions to be executed by the at least one processor to perform a method comprising:
   receiving an input of text data from a user for an inspection report relating to one or more images which are obtained by one or more inspections on an object;
   identifying, in a real-time manner, one or more context features from the input text data which currently has been inputted by the user;
   obtaining one or more measured values by performing measurement of the object using the one or more images;
   processing items corresponding to the one or more measured values, the processing comprising filtering and/or sorting the items based on one or more of the identified context features;
   causing, in a case where the one or more context features have been identified, a display unit to display a list of the processed items corresponding to the one or more measured values, as candidates for measured values relating to the one or more context features;
   receiving a selection for an item in the list, the selected item corresponding to a measured value relating to the one or more context features; and
   inserting information about the measured value corresponding to the selected item at a position adjacent to the input text data from which the one or more context features are identified.

2. The apparatus according to claim 1, wherein the measurement is performed by the user.

3. The apparatus according to claim 1, wherein the one or more context features comprise at least one of:
   keywords relating to regions or parts of the object, and
   a set of words or phrases which are selected based on parts of speech or semantic features.

4. The apparatus according to claim 1, wherein the processing of the items corresponding to the one or more measured values further comprises:
   generating one or more textual representations, as processed measured values, for the items corresponding to the one or more measured values based on one or more of the identified context features.

5. The apparatus according to claim 4, wherein the textual representation is generated conforming to predetermined syntactical rules.

6. The apparatus according to claim 4, wherein the one or more of the identified context features comprise the most-recently-identified context feature or context features.

7. The apparatus according to claim 1, wherein the one or more of the identified context features comprises the most-recently-identified context feature or context features.

8. The apparatus according to claim 1, wherein the causing further comprises causing the display unit to display a thumbnail for each listed item on the list of processed items corresponding to the one or more measured values.

9. The apparatus according to claim 1, wherein if the current user input is identified as a context feature or matched with an identified context feature, it is determined that a specific user input is detected.

10. The apparatus according to claim 1, wherein the object comprises a patient, the inspection report comprises a medical report for the patient, and the inspection comprises any inspection on the patient from which an image can be derived.

11. A method for generating an inspection report, comprising:
receiving an input of text data from a user for an inspection report relating to one or more images which are obtained by one or more inspections on an object;
identifying, in a real-time manner, one or more context features from the input text data which currently has been inputted by the user;
obtaining one or more measured values by performing measurement of the object using the one or more images;
processing items corresponding to the one or more measured values, the processing comprising filtering and/or sorting the items based on one or more of the identified context features;
causing, in a case where the one or more context features have been identified, a display unit to display a list of the processed items corresponding to the one or more measured values, as candidates for a measured value relating to the one or more context features;
receiving a selection for an item in the list, the selected item corresponding to a measured value relating to the one or more context features; and
inserting information about the measured value corresponding to the selected item at a position adjacent to the input text data from which the one or more context features are identified.

12. The method according to claim 11, wherein the measurement is performed by the user.

13. The method according to claim 11, wherein the context features comprises at least one of:
keywords relating to regions or parts of the object, and
a set of words or phrases which are selected according to parts of speech or semantic features.

14. The method according to claim 11, wherein the processing of the items corresponding to the one or more measured values comprises:
generating one or more textual representations, as processed measured values, for the items corresponding to the one or more measured values based on one or more of the identified context features.

15. The method according to claim 14, wherein the one or more of the identified context features comprise the most-recently-identified context feature or context features.

16. The method according to claim 11, wherein the one or more of the identified context features comprise the most-recently-identified context feature or context features.

17. An information processing apparatus comprising:
at least one processor; and
a memory storing a program including instructions to be executed by the at least one processor to perform a method comprising:
receiving an input of text data for an inspection report relating to one or more images which are obtained by one or more inspections on an object;
identifying one or more context features from the input text data;
obtaining one or more measured values by performing measurement of the object using the one or more images;
causing, in a case where the one or more context features have been identified, a display unit to display a list of the one or more measured values which is obtained, as candidates for measured values relating to the one or more context features;
receiving a selection of inspection data for a measured value in the list, the measured value relating to the one or more context features; and
inserting information about the selected measured value at a position adjacent to the input text data from which the one or more context features are identified.

18. The information processing apparatus according to claim 17, wherein the one or more context features comprise at least one of:
keywords relating to regions or parts of an object which has been subjected to the one or more inspections, and
a set of words or phrases which are selected based on parts of speech or semantic features.

19. The information processing apparatus according to claim 17, wherein the one or more of the identified context features comprise the most-recently-identified context feature or context features.

20. An information processing method comprising:
receiving an input of text data for an inspection report relating to one or more images which are obtained by one or more inspections on an object;
identifying one or more context features from the input text data;
obtaining one or more measured values by performing measurement of the object using the one or more images;
causing, in a case where the one or more context features have been identified, a display unit to display a list of the one or more measured values which is obtained, as candidates for measured values relating to the one or more context features;
receiving a selection for a measured value in the list, the measured value relating to the one or more context features; and
inserting information about the selected measured value at a position adjacent to the input text data from which the one or more context features are identified.

21. The information processing method according to claim 20, wherein the one or more context features comprise at least one of:
keywords relating to regions or parts of an object which has been subjected to the one or more inspections, and
a set of words or phrases which are selected based on parts of speech or semantic features.

22. The information processing method according to claim 20, wherein the one or more of the identified context features comprise the most-recently-identified context feature or context features.

* * * * *